United States Patent [19]
Göhring

[11] Patent Number: 5,783,817
[45] Date of Patent: Jul. 21, 1998

[54] DEVICE FOR DETECTING A POSITION OF AN OBJECT MOVING IN ROTATION OR TRANSLATION RELATIVE TO A BASE

[75] Inventor: Frank Göhring, Frankfurt, Germany

[73] Assignee: VDO Adolf Schindling AG, Frankfurt, Germany

[21] Appl. No.: 708,033

[22] Filed: Aug. 23, 1996

[30] Foreign Application Priority Data

Aug. 23, 1995 [DE] Germany .................. 195 30 904.9

[51] Int. Cl.$^6$ ................................................ G01D 5/34
[52] U.S. Cl. ...................... 250/231.14; 250/559.32; 341/11; 356/375
[58] Field of Search .............. 250/231.14, 231.16, 250/231.18, 559.32, 559.26; 341/11, 13; 356/375

[56] References Cited

U.S. PATENT DOCUMENTS

| | | | |
|---|---|---|---|
| 4,529,964 | 7/1985 | Minami et al. | 250/231.14 |
| 5,336,884 | 8/1994 | Khoshnevisan et al. | 250/231.14 |

*Primary Examiner*—Que Le
*Attorney, Agent, or Firm*—Martin A. Farber

[57] ABSTRACT

In a device for detecting a position of an object (linear or circular strip) moving in rotation or translation relative to a base, an incremental track bearing periodically recurring marks and two index tracks bearing a plurality of index marks are scanned by sensors. These sensors supply analog signals which are complementary to each other. In each case, two complementary signals are combined to form a logical track. By a combining of the logical tracks with each other, a further logical track is formed which contains a serial code which corresponds to the absolute value of the position of the object.

10 Claims, 2 Drawing Sheets

1

DEVICE FOR DETECTING A POSITION OF AN OBJECT MOVING IN ROTATION OR TRANSLATION RELATIVE TO A BASE

FIELD AND BACKGROUND OF THE INVENTION

The present invention relates to a device for detecting a position of an object moving in rotation or translation relative to a base, having an incremental track with periodically recurring marks, and an index mark for characterizing an absolute value of the position of the object, and a sensor which is developed for scanning the incremental track.

Such devices are generally known. In them, the position of the object is frequently determined by count values from the sensors of the incremental track so that the position of the object is determined from a known starting value. By the index mark, the absolute value of the position can be established and used as starting value for the further determination of the position via the count values.

In a device for determining the disk angle and the speed of rotation of an engine of a motor vehicle, a gear ring is generally placed on the circumference of the flywheel, it being scanned by an inductive sensor. In order to obtain a starting value, two teeth are missing at one place. Marks of the incremental track and the index mark are thus combined on a single track. The two missing teeth serve for marking the starting value, frequently the upper dead center of a piston. The exact disk angle is then determined via the count values.

These devices have the disadvantage of requiring a very large amount of computing due to the continuous determination of the position of the object. The determination of the position by count values is particularly disadvantageous in the case of high speeds of the object since a high scanning rate is then necessary.

In the case of the combined detection of the speed of rotation and of the disk angle of the engine of a motor vehicle, the above-mentioned disadvantages are particularly important since the engine ordinarily operates within a wide range of speeds. Furthermore, the absolute value of the position is available only once during a revolution of the engine. Increased demands on the concentric running of the engine in the case of a decreased level of the idling speed require a substantially greater angular resolution on the part of the sensor system.

SUMMARY OF THE INVENTION

It is an objective of the invention to develop a device of the aforementioned type so that it detects several absolute values of the position of the object with improved precision.

According to the invention, several different index marks (6–11, 38, 39, 41, 42) are arranged on an index track (4, 5, 34, 35), and can be scanned by a sensor (19–20). The position of the object (strip 1, disk 33) can be determined from a serial code (32) of a logical track (31) which is formed from a comparison of the signals (21–26) of the sensors (14–17, 19, 20) of the incremental track (2, 36) and the index track (4, 5, 34, 35).

Thus, the absolute values of the position of the object are present on the logical track in digitalized form, i.e. in a time sequence of signals having the values "1" and "0", as a result of which a particularly large number of index marks which differ from each other can be present on the index track. Such a serial code permits a dependable determination of the exact position of the object. The incremental track establishes a scanning period solely by its dimensions and produces a scanning frequency with the speed of the object. The scanning serves in this connection as a clock-pulse generator for a time sequence of the signals of the logical track. The index track can now contain as many index marks as there are absolute values required so that no determination is effected via count values. The index marks themselves can be formed of several marks having different dimensions. For the selection of these marks it is merely important that, together with the marks of the incremental track, they produce a special time sequence with the values "0" and "1" on the logical track. The associating of the individual serial codes with the absolute values of the positions can be established for instance if, with simultaneous low-levels of the sensors of the incremental track and of the sensor of the index track, the logical track has a "1" and otherwise a "0".

One particularly advantageous further development of the invention is obtained if the incremental track (2, 36) is scanned by two sensors (14–17) which are at a distance from each other equal to one quarter of the scanning period (18). With the second sensor on the incremental track, a doubling of the values of the logical track and thus also a large increase in the precision of the determination of the absolute values of the position is obtained without increase in the scanning rate. Furthermore, the direction of movement of the object can thus be recognized.

If the sensor gives off too weak a signal, for instance due to dirt in the event of optical marks or due to tolerances in the distance of the marks from the sensor, any errors can be compensated for in simple manner if two index tracks (4, 5, 34, 35), the index marks of which (6–11, 38, 39, 41, 42) are arranged in a manner complementary to each other, are scanned by in each case one sensor (19, 20). This compensation effect is due to the fact that sensors, for instance, optical sensors, supply a voltage as a function of the intensity of the incident light. If the intensity of the light decreases due to dirt on the two sensors, then a switch time can still always be exactly determined by an equally large electrical voltage of the sensors. It is then possible to obtain from the two complementary signals a digital signal which can be associated substantially more precisely with a position of the object than an analog signal which is dependent on an intensity of light.

Errors which might be produced by weak signals can also be easily compensated for in the case of the sensors of the incremental track if four sensors (14–17), each of which is developed for the scanning of one fourth of the scanning period (18), are present over the incremental track (2, 36). In each case two sensors which are spaced apart by half a scanning period are then combined to form a resultant sensor. By this arrangement, each sensor produces two complementary signals. Furthermore, the sensors have the dimensions of a complete scanning period, as a result of which an electronic compensating for mounting inaccuracies is made possible.

Frequently it is not necessary to determine the exact position of the object at every time. In such case, computing power is saved if each index track (4, 5, 34, 35) in each case has code regions (13, 37) with index marks (611, 38, 39) which are arranged complementary to each other, and regions (12, 40) with index marks (41, 42) which are arranged in a manner not complementary to each other. In the code regions with the index marks arranged complementary to each other, an exact determination of the absolute position of the object is thus possible. The regions with non-complementary index marks can, as roughly resolving increments, generate count signals in the case of high speeds of the object.

By the apparatus of the invention, it is possible to determine not only the position of the object but also its speed. This can be done in the manner that the speed is determined from the values of the incremental track. For this, the expenditure is particularly simple since the speed of the object is proportional to the scanning frequency. This possibility leads to particularly accurate values but has the disadvantage of requiring a high scanning frequency in the case of high speeds. By a periodic change of a non-complementary region (12, 40) and a complementary code region (13, 37) of the index tracks (4, 5, 34, 35), this disadvantage can be eliminated. In this way, a new logical incremental track with a longer scanning period and thus a lower scanning frequency for the same speed is obtained from the two index tracks. This new logical incremental track then changes between the states and "1" upon each change between region and code region.

In such devices, sensors which inductively detect the marks are frequently used. These sensors have the advantage of being relatively insensitive to dirt. In the case of several tracks, the relatively high cost of producing the marks and the sensors constitutes a disadvantage. If several tracks and sensors are to be used, it is advantageous if the tracks (2, 4, 5, 34–36) are developed for scanning with optical sensors (14–17, 19, 20). The marks are then, in the most favorable case, a sequence of slits and bars.

The invention is particularly suitable for the use of a device in accordance with at least one of the preceding features for the detecting of a disk angle and a speed of rotation and for monitoring the rotational accuracy of the engine of a motor vehicle.

In engines of motor vehicles, several tracks with marks are then to be arranged only on a cam shaft or crank shaft or on a flywheel. Particularly in the case of engines having several cylinders, it is advantageous if, for the determination of the firing point and of the injection pulse, the disk angle of the engine be separately and accurately determined for each cylinder. In this way, the engine can be started when the firing point of the first cylinder to be fired is established. As compared with the prior art, the engine can in this case, in the most favorable event, be started one revolution of the engine earlier. The apparatus in accordance with the invention also permits a large number of index marks which can be used for different operating conditions of the engine without count values having to be formed, as in the prior art.

The speed of rotation of the engine can be determined in three different ways with the apparatus of the invention, depending on the required precision of the values. For example, a given index mark which occurs only once per revolution can be detected for an indication of the speed of rotation on a tachometer. The most accurate method of determining the speed of rotation is, however, measurement of the scanning frequency of the incremental track. Since this requires a high scanning frequency, it is suitable primarily for the detection of low speeds of rotation. As an alternative to this, the speed of rotation can also be determined by a periodic change of the non-complementary region and the complementary code region of the index tracks. In this way, a new logical incremental track having a larger scanning period and thus a lower scanning frequency for the same speed is produced from the two index tracks. The accuracy of this method is thus intermediate between that of the other two.

Since a non-uniform rotation of the engine indicates, for instance, that the combustion is defective or that the idling speed is too low, it should be monitored. This monitoring is particularly important in the low speed range. In the high speed range, it is important, however, not to let the scanning frequency become too great. Such a conflict in objectives can easily be solved with the device in accordance with the invention if the rotational accuracy of the engine at low speeds of rotation is obtained by monitoring the incremental track. With high speeds of rotation, one can for this purpose, simply switch to a period change of non-complementary region and complementary code region of the index tracks. Due to the invention, a definitely higher angular resolution is obtained also in the case of lower speeds of revolution.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENT

Figure 1:
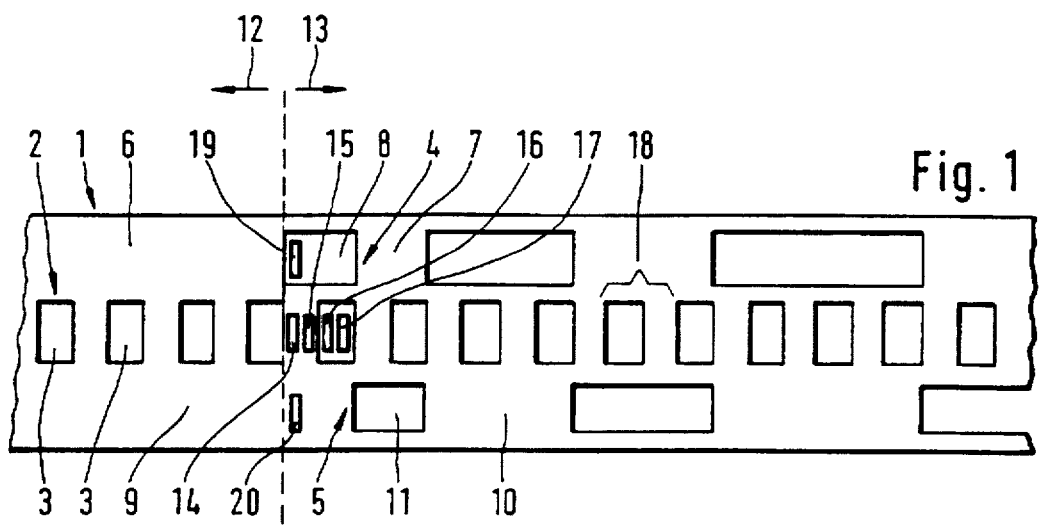
FIG. 1 shows a device in accordance with the invention for detecting the position of an object moving in translation with an evaluation of signals.

FIG. 1 shows a portion of a strip 1 on which three tracks bearing marks are arranged. The middle track is an incremental track 2 with periodically recurring marks 3. The two outer tracks are index tracks 4, 5, with index marks 6–11 which are characterized by a different lengths and by different distances apart. The index tracks 4, 5 are divided into a region 12 in which both have noncomplementary index marks 6, 9, and into a code region 13 with index marks 6, 7, 10, 11 arranged complementary to each other. Over the incremental track 2 there are arranged four sensors 14–17, each of which is developed for scanning one fourth of its scanning period 18. Accordingly, the sensors 14–17 together cover an entire scanning period 18. Over the index tracks 4, 5 there is present in each case a sensor 19, 20 of the same type as a sensor 14–17 over the incremental track 2. The sensors 14–17, 19 and 20 are in this case optical sensors which supply a voltage which is dependent on incident light. The periodically recurring marks 3 and the index marks 6–11 consist of slits and bars in the strip 1 so that light falls on the sensors 14–17, 19 and 20 as a function of the position of the strip 1.

Figure 2:
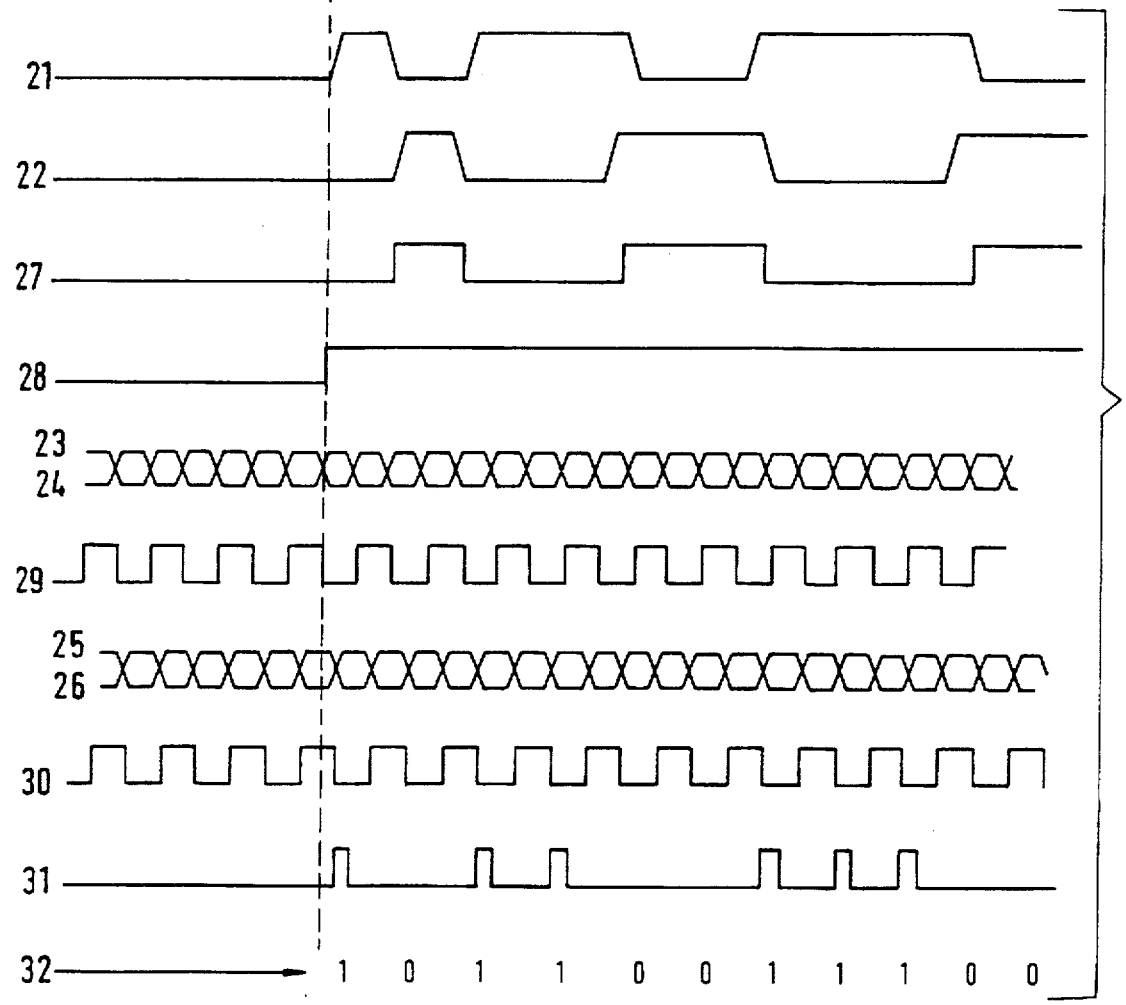
FIG. 2 is a set of waveforms useful in explaining operation of the device of FIG. 1, the waveforms being drawn in registration with marks of FIG. 1.

The sensors 14–17, 19, 20 themselves supply an analog voltage signal 21–26 (FIG. 2) which increases slowly to a maximum value upon passing a mark 3 on an index mark 6–11, and then drops again. In order that the position of the mark 3 or an index mark 6–11 can be clearly determined, voltage signals 21, 22; 23, 24; 25, 26 which are, in principle, complementary to each other are evaluated. In the code region 13, the voltage signals 21, 22 of the sensors 19, 20 of the index tracks 4, 5 are complementary to each other. In the case of the incremental track 2, the sensors 14, 16; 15, 17 which are, in each case, half a scanning period 18 apart from each other always supply complementary voltage signals 23–26. A digital-analog converter (not shown) then produces a logical track 27, 29, 30 from two complementary voltage signals 21–26 by regularly changing between the states "0" and "1" in the case of equally large values of the complementary voltage signals 21, 22; 23, 24; 25, 26. For instance, in this way, a logical track 27 is produced from the analog voltage signals 21, 22 of the sensors 19, 20 of the index marks 8–11.

In order to associate this logical track 27 with a position of the strip 1, it must be related to a clock frequency which is dependent on the speed of the strip 1. For this purpose, two further logical tracks 29, 30 are formed from the four analog voltage signals 23–26 of the sensors 14–17 of the incremental track 2. These logical tracks 29, 30 represent a direct function of scanning period 18 and speed of the strip 1. By a combining of the logical track of the index tracks 4, 4 and of the logical tracks 29, 30 of the incremental track 2, there is finally produced another logical track 31 which contains a serial code 32 by which the position of the strip 1 can be unambiguously determined. It would also be sufficient to produce only one logical track 29 from the incremental track 2. The advantage of the two logical tracks 29, 30 which have values which are only one fourth of the scanning period 18 apart is that, in this way, it is possible to reduce the scanning period 18 by one half without increasing a scanning frequency. This leads to a more accurate determination of the position of the strip 1.

In order to determine a speed of the strip 1 on the basis of a periodic change of the code regions 13, and of the non-complementary regions 12, a new logical track 28 is formed which changes its state always upon a change of non-complementary region 12 and code region 13. This logical track 28 thus behaves like another incremental track.

Figure 3:
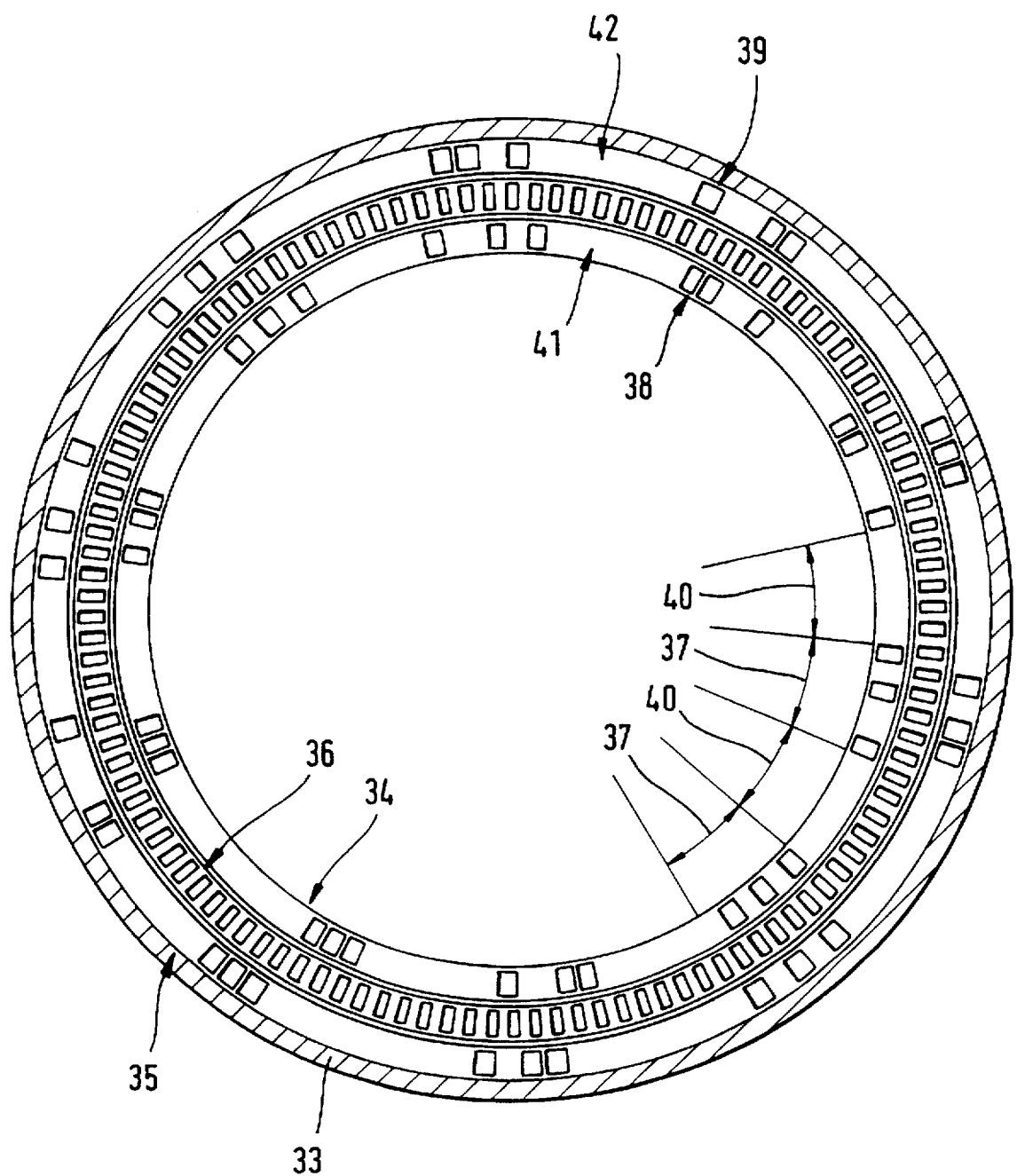
FIG. 3 is a disk having marks for an engine of a motor vehicle.

In FIG. 3, three tracks are present on a disk 33, the inner and the outer of these three tracks each representing an index track 34, 35, and the center track representing an incremental track 36. The disk 33 is particularly suited for a detection of speed of rotation, disk angle and rotational accuracy of an engine of a motor vehicle. The tracks 34–36 are scanned with sensors 14–17, 19, 20, as in FIG. 1. The production of logical tracks and a serial code is also effected in the manner described in FIG. 1.

There can be clearly noted on the index tracks 34, 35 a periodic change of code regions 37 on which the index marks 38, 39 are developed complementary to each other, and idle regions 40 on which the index marks 41, 42 are not developed complementary to each other. In each of the code regions 37, the index tracks 34, 35 have a different sequence of index marks so that after a scanning they are clearly to be associated with a given disk angle of the disk 33.

The speed of rotation of the engine is derived from a scanning of the incremental track 36. As an alternative to this, the periodic change between the code regions 37 and the idle regions 40 of the index tracks 34, 35 can also be detected since a logical incremental track 28 can be produced from this, similar to the manner of procedure in FIG. 1.

For the determination of the rotational accuracy of the engine, variations in the scanning frequency of the incremental track 36 can be used. In case of higher speeds of rotation, for the determination of the rotational accuracy of the engine, the logical incremental track 28 obtained in FIG. 1 from the periodic change of the code regions 37 and the non-complementary regions 40 is used.

I claim:

1. A device for detecting a position of an object moving in rotation or translation relative to a base, the device comprising:

an incremental track with periodically recurring marks and an index track having plural index marks serving to provide an absolute value of the position of the object;

a plurality of sensors for scanning the incremental track and the index track, each of said sensors providing a signal in response to a sensing of one of said marks;

logic means responsive to the signals of said sensors for outputting a logical track of digital signals representing a serial code, said logic means being operative to compare various ones of the sensor signals.

2. A device according to claim 1, wherein:

said serial code is a first serial code;

said track of digital signals represents a plurality of serial codes including said first serial code; and individual ones of said serial codes correspond to respective ones of said index marks.

3. A device according to claim 1, wherein:

a first and a second of said plurality of sensors scan said incremental track; and said first and said second sensors are at a distance from each other equal to one quarter of a scanning period of said incremental track.

4. A device according to claim 3, wherein:

said index track is a first index track, and said device further comprises a second index track having index marks; and the index marks of said first index track and of said second index track are arranged with the index marks of the respective index tracks being complementary to each other, individual ones of said plurality of sensors being positioned for scanning respective ones of said index tracks.

5. A device according to claim 1, wherein:

said index track is a first index track, and said device further comprises a second index track having index marks; and the index marks of said first index track and of said second index track are arranged with the index marks of the respective index tracks being complementary to each other, individual ones of said plurality of sensors being positioned for scanning respective ones of said index tracks.

6. A device according to claim 3, wherein:

four sensors of said plurality of sensors, including said first and said second sensor, are arranged for scanning respective portions of the scanning period of the incremental track, each of said portions of the scanning period being equal to one quarter of the scanning period.

7. A device according to claim 1, wherein:

said index track is a first index track, and said device further comprises a second index track having index marks;

the index marks of said first index track and of said second index track are arranged with the index marks of the respective index tracks being complementary to each other; and a plurality of further index marks are disposed in said index tracks providing code regions in said first and said second index tracks in which code regions the index marks are arranged in a manner not complementary to each other.

8. A device according to claim 7, wherein:

the index tracks have complementary and non-complementary regions of said index marks providing a plurality of complementary and non-complementary code regions of said index marks, and providing a periodic change of non-complementary code region and complementary code region of the index tracks.

9. A device according to claim 8, wherein:

individual ones of said plurality of sensors being positioned for scanning respective ones of said index tracks and said incremental track.

10. A device according to claim 1, wherein:

said incremental track and said index track are circular and are arranged concentrically to enable detection of a disk angle and rotational speed for a monitoring of a rotational accuracy of the engine of a motor vehicle.

* * * * *